ABSTRACT OF THE DISCLOSURE

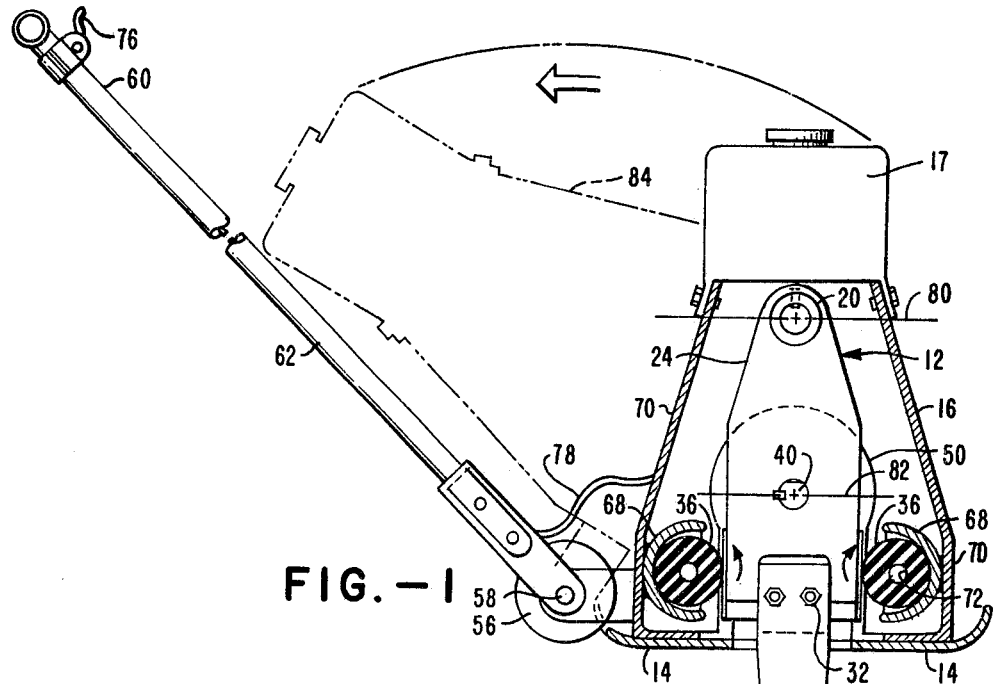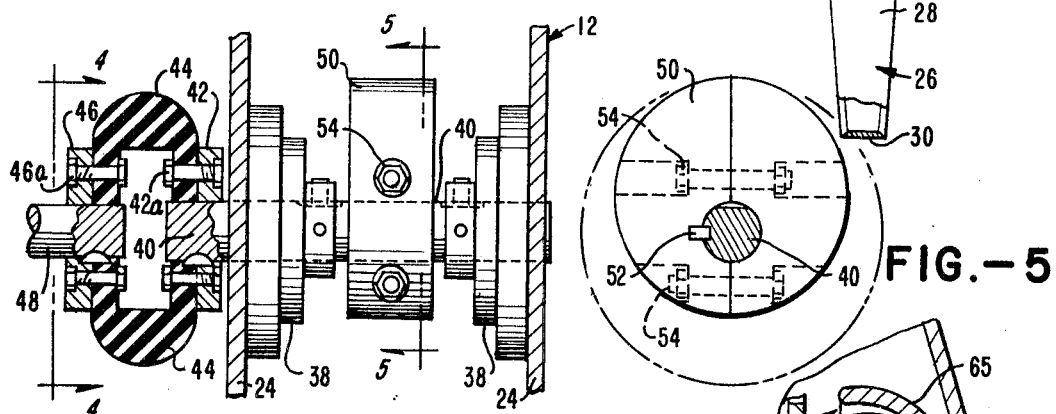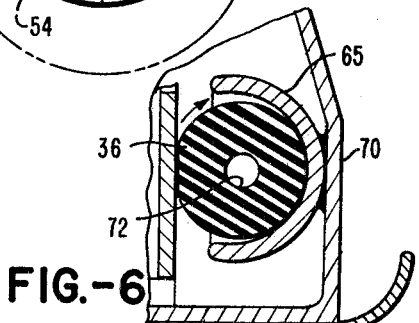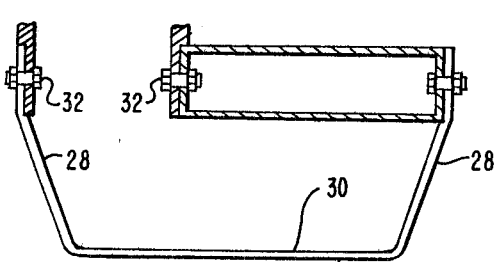

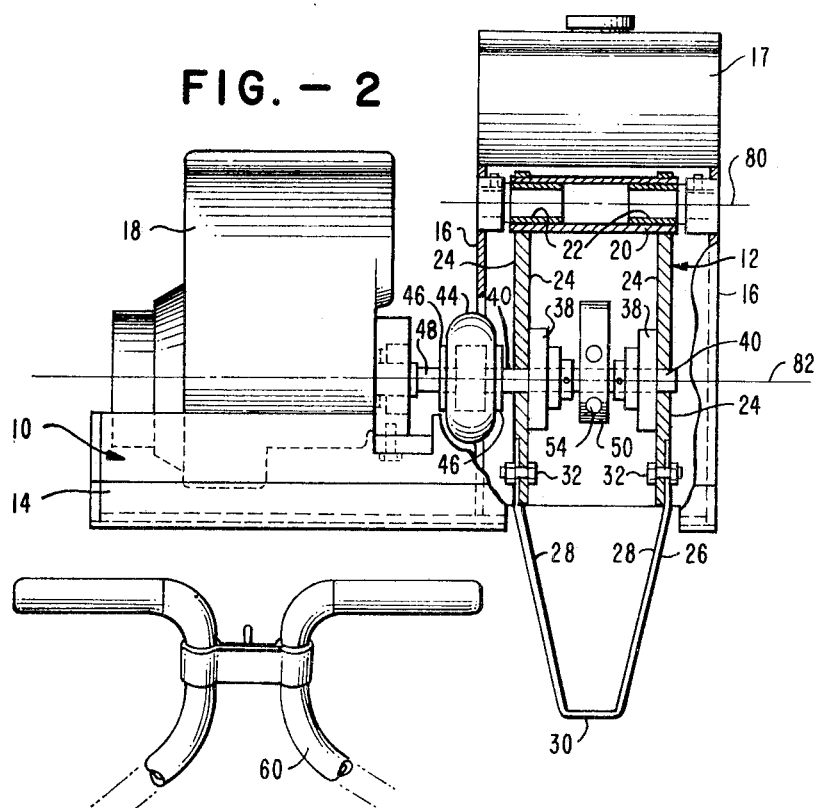
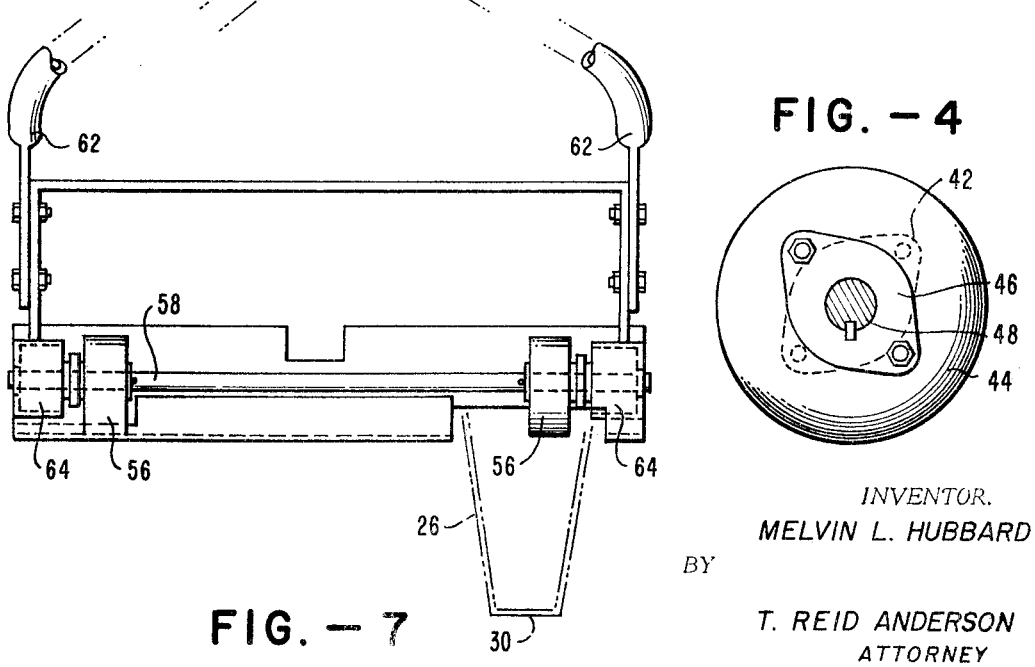
INVENTOR.
MELVIN L. HUBBARD
BY
T. REID ANDERSON
ATTORNEY 3,508,616
TRENCHING APPARATUS
Melvin L. Hubbard, 34781 Camino Capistrano,
Capistrano Beach, Calif. 92624
Filed July 11, 1966, Ser. No. 564,418
Int. Cl. A01b 35/00
U.S. Cl. 172—40                           5 Claims

A trenching apparatus having a pivoted cutting assemblage actuated by an off-weight with the cutting assemblage vibrating between two spaced rubber snubbers which are in continual engagement therewith.

---

This invention relates to a trencher and more particularly to a trencher especially suitable for underground pipe installation such as water sprinkler systems and to a device suitable for sod removal and lawn renovation.

Trenching apparatus including sod cutting machines have typically comprised heavy structures which upon striking an immovable object is damaged or the machine is cast to one side.

It is a principle object of this invention to provide a trencher structure which permits the operator to "feel" and avoid large roots, rocks, pipes and other underground obstructions which commonly damage other types of trenchers.

It is a further object of the invention to provide a machine which moves rapidly over a sod bed, stripping the sod evenly to an accurate predetermined depth.

It is a further object of the invention to provide a trencher structure which permits vibration of the cutting blade at extremely high oscillations, typically in the range of 5000–6000 per minutes.

It is a further object of the invention to provide an inexpensive, simple structure for a trenching machine.

It is another object of the invention to provide a portable trencher which may be used in hard-to-reach areas as well as up-and-down or across slopes.

The trencher apparatus of the invention comprises in a preferred form a carriage or frame having a ground engaging portion which may be a sled or skid plate. The carriage frame supports a cutting assemblage which is pivotally mounted thereon and includes a vertical hanger member carrying a horizontal knife which is adapted for oscillatory motion at a level below the ground engaging portion of the carriage. Means is provided for vibrating the cutting assemblage in the direction of movement of the carriage, this means including a rotatable off-weight. Shock absorbing rubber snubbers are disposed at opposite sides of the vertical hanger member of the cutting assemblage. The rubber snubbers are in continuous engagement with the hanger member throughout vibration of the cutter assemblage. By changing the shape of the cutting blade being used, different jobs may be accomplished, such as sod or turf cutting or the device may be used for cutting a trench for laying pipe. The use of a rotating off-weight for imparting vibration to the cutting assemblage is a particularly desirable feature as it lessens the likelihood of breakage of the mechanism if an immovable object is encountered. Additionally, the use of the rotating off-weight in combination with the rubber snubbers permit the obtaining of very high frequency of the cutting blade which drastically improves the efficiency of the machine. In contrast with the conventional heavy structure trenching equipment commercially available, the device of the invention is significantly lighter and despite its lighter structure accomplishes substantially equivalent work. It will be appreciated that this is a decided advantage in design, economy in manufacture, and reduction in maintenance costs.

These and other objects and advantages of the trencher of the invention will become more apparent in view of the following specifications and drawings wherein:

FIG. 1 is a side elevational view, partially cut away, of a preferred embodiment of the trenching apparatus of the invention;

FIG. 2 is a front elevational view, partially cut away, of the apparatus of FIG. 1 with the handle and transport casters deleted for illustrative purposes;

FIG. 3 is a fragmentary, detailed enlarged view of a central portion of the mechanism of FIG. 2;

FIG. 4 is a sectional view taken along line 4—4 of FIG. 3;

FIG. 5 is a cross sectional view taken along line 5—5 of FIG. 3;

FIG. 6 is a fragmentary, enlarged detailed cross section of the rubber snubber;

FIG. 7 is a front elevational view of the ground engaging sled carriage of the apparatus of FIG. 1 with the lower portion of the cutting assemblage being indicated in phantom lines; and FIG. 8 is an elevational view illustrating a sod cutting blade which may be substituted for the trenching blade of FIGS. 1 and 2.

The trencher of the invention as best seen in FIGURES 1 and 2 is made up of a carriage or frame 10 on which there is pivotally mounted a cutting assemblage 12. The carriage frame 10 comprises a ground engaging sled or skid plate 14 upon which there is mounted a motor 18 and an upright cutting assemblage support structure 16. The latter structure at its upper end supports a fuel tank 17. The cutting assemblage support structure 16 comprises spaced side frame members which immediately below the tank 17 carry on their respective inside faces bronze bearings 22 (FIG. 2) upon which there is journalled a tubular member 20 of the cutting assemblage 12. The tubular member 20 supports two spaced downwardly extending verticle hanger arms 24 which at their lower ends are bolted to a V shape cutting blade 26. The cutting blade 26 includes two downwardly-extending and inwardly-sloping side members 28 which terminate in a horizontally disposed knife 30. The cutting blade 26 illustrated in FIGS. 1 and 2 is especially adapted to cutting of trenches suitable for the laying of pipe. In the instance where it is desired to cut sod, bolts 32 at the lower end of the hanger arms 24 are removed and the blade of FIG. 8 substituted.

As best seen in FIG. 1, the opposite sides of the two hanger arms 24 engage horizontally-disposed, cylindrical, hard rubber snubbers 36. The rubber snubbers 36 are in continuous engagement with the hanger arms 24, that is to say, the snubbers are always under a load. The snubbers 36 are of a length adequate to engage both of the spaced hanger arms 24.

Reference to FIGURES 2 and 3 will show that the hanger arms 24 support on their inner faces two flange bearings 38 in which there is journalled a horizontally disposed rotatable shaft 40. The latter shaft 40 at its inner end (outside of the cutting assemblage 12) is keyed to a bracket 42 which is bolted to one face of a hard rubber coupling member 44 of the doughnut type. It will be seen that the shaft 40 terminates at the coupling member 44. The other face of the coupling member 44 is bolted to a similar bracket 46 which in turn is keyed to a second shaft 48. The second shaft 48 connects with the aforementioned motor 18. Operation of the motor 18 causes the second shaft 48, the rubber coupling member 44 and the shaft 40 to rotate together.

The shaft 40 intermediate of its length and between the hanger arms 24 supports an off-weight or eccentric 50.

As best seen in FIG. 5 the off-weight 50 comprises two halves which are bolted together and held to the shaft 40 by a key 52. The off-weight 50 may be removed from the shaft 40 by disengagement of bolts 54. The provision of the off-weight eccentric 50 imparts a vibration or oscillation to the pivotally-supported cutting assemblage 12 upon the operation of the motor 18, thus providing the cutting action. The location of the rubber snubbers 36 on opposite sides of the cutting assemblage and in engagement therewith assures that the cutting blade 26 will move through an extremely short arc which is inducive to effective cutting.

It will be seen that the rubber coupling member 44 serves in a dual role in permitting some flexing of shaft 40 out of alignment with the second shaft 48 and also to minimize transmission of vibration from the cutting assemblage 12 to the carriage frame 10.

The carriage frame 10 supports at its forward end two transport casters 56 (FIGURES 1 and 7) which are spaced apart on an axle 58. The casters 56 are normally out of engagement with the ground during the operation of the machine but when the apparatus is not in use and the cutting assemblage support structure 16 has been swung into the position illustrated in phantom lines in FIG. 1, the casters will engage the ground upon depression of handle 60. In the latter position, the apparatus may be transported over the ground by an operator pulling upon the handle 60. Handle 60 divides into two downwardly extending arms 62 which at their lower ends are held through rubber mounts 64 to the aforementioned axle 58 at the forward end of the sled 14 as shown in FIGURE 7. The rubber mounts 64 minimize transmission of vibration to the operator upon operation of the machine. During operation of the motor 18, the machine is pulled manually over the ground.

The design and location of the rubber snubbers 36 contribute significantly to the efficiency of the machine. Referring to FIGS. 1 and 6 it will be seen that each of the rubber snubbers 36 is freely carried within a cage member 68, which are held to the lower inside faces of the opposing upright frame members 70 or the cutting assembly support structure 16. The two cage members 68 are arcuate in cross section with the respective rubber snubbers 36 being disposed on the concave side thereof. The opposite ends of the cages 68 carry closure plates which serve to contain the rubber snubbers 36 within the cages. It will be seen that the rubber snubbers 36 are not pivotally mounted but are free to move within their respective cages 68 under the influence of the vibrating cutting assemblage 12. The cutting assemblage 12 moves in a short arc and because of this arcuate movement (as contrasted to planar movement) the rubber snubbers are rotated within their respective cages 68. Rotation of the snubbers is highly desirable as this minimizes localized heating and rapid deterioration of the rubber. The presence of a hollow core 72 extending axially of the hard rubber snubbers 36 also assist in cooling. It will be appreciated that cooling is a serious problem where the machine operates typically in the range of 5000–6000 oscillations per minute. The gasoline motor 18 is controlled by the hand lever 76 attached to the carburator cable 78.

It will be understood that various changes may be made in the form details and arrangements of the various parts without departing from the scope of my invention.

I claim:
1. A trenching apparatus comprising:
a carriage having a ground engaging portion;
a cutting assemblage pivotally mounted on said carriage and including a horizontal knife adapted for oscillatory motion at a level below the ground engaging portion of the carriage and a generally vertical hanger member including a pair of spaced arm members extending generally downward from the carriage and pivoted about a common axis, thereby pivotally supporting the knife to the carriage;
means for vibrating the cutting assemblage in the direction of movement of the carriage, said vibrating means including a rotatable off-weight, said off-weight being mounted on and moved by a shaft rotatable supported by the cutting assemblage between the arm members with means external of the cutting assemblage for rotating the shaft and off-weight, said off-weight upon rotation providing momentum for movement of the pivoted cutting assemblage; and
shock absorbing rubber snubbers disposed on the opposite sides of the vertical hanger member and in continual engagement with said hanger member throughout vibration of the cutter assemblage.

2. A trenching apparatus comprising:
a carriage having a ground engaging portion;
a cutting assemblage pivotally mounted on said carriage and including a horizontal knife adapted for oscillatory motion at a level below the ground engaging portion of the carriage and a generally vertical hanger member pivotally supporting the knife to the carriage;
means for vibrating the cutting assemblage in the direction of movement of the carriage, said vibrating means including a rotatable off-weight; and
shock absorbing rubber snubbers disposed on the opposite sides of the vertical hanger member and in continual engagement with said hanger member throughout vibration of the cutter assemblage, said rubber snubbers comprising movable rubber rollers.

3. An apparatus in accordance with claim 2 wherein the rubber snubbers have hollow cores.

4. An apparatus in accordance with claim 2 wherein each of the rubber snubbers is freely held within a cage member.

5. An apparatus in accordance with claim 4 wherein each cage member has an arcuate cross section opening toward the hanger and the rubber snubber is disposed on the concave side of the arcuate cage member.

References Cited

UNITED STATES PATENTS

| | | | |
|---|---|---|---|
| 2,792,769 | 5/1957 | Harshberger | 172—40 |
| 2,702,502 | 2/1955 | Rogneby | 172—19 |

FOREIGN PATENTS

| | | |
|---|---|---|
| 116,386 | 6/1961 | U.S.S.R. |

ROBERT E. PULFREY, Primary Examiner

J. W. PETERSON, Assistant Examiner

U.S. Cl. X.R.

172—19